US012305820B2

(12) United States Patent
Omae et al.

(10) Patent No.: US 12,305,820 B2
(45) Date of Patent: May 20, 2025

(54) LIGHT SOURCE UNIT, LIGHT SOURCE DEVICE, AND METHOD FOR FORMING LIGHT SOURCE UNIT

(71) Applicant: Ushio Denki Kabushiki Kaisha, Tokyo (JP)

(72) Inventors: Yasushi Omae, Tokyo (JP); Yoshihiro Kanahashi, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 19 days.

(21) Appl. No.: 18/348,031

(22) Filed: Jul. 6, 2023

(65) Prior Publication Data

US 2024/0011607 A1 Jan. 11, 2024

(30) Foreign Application Priority Data

Jul. 8, 2022 (JP) ................................ 2022-110130

(51) Int. Cl.
*F21S 2/00* (2016.01)
*B41J 11/00* (2006.01)
(Continued)

(52) U.S. Cl.
CPC ............ *F21S 2/005* (2013.01); *B41J 29/377* (2013.01); *F21V 23/005* (2013.01); (Continued)

(58) Field of Classification Search
CPC ................ B41J 29/377; B41J 11/00214; B41J 11/00218; F21V 29/67; F21V 29/673; (Continued)

(56) References Cited

U.S. PATENT DOCUMENTS

2010/0149809 A1* 6/2010 Ruud ...................... F21S 2/005
362/249.02
2023/0392779 A1* 12/2023 Murayama ................ F28F 1/32

FOREIGN PATENT DOCUMENTS

JP 2013-171882 A 9/2013
JP 2017-060912 A 3/2017
(Continued)

OTHER PUBLICATIONS

No Do Hoan, "Printing UV Ink Curing System Using UV LED", Aug. 29, 2019, EPO Patent Translate of "Description KR102016288B1", pp. 1-11. (Year: 2019).*
(Continued)

*Primary Examiner* — Alan B Cariaso
(74) *Attorney, Agent, or Firm* — Studebaker Brackett PLLC

(57) ABSTRACT

A light source unit includes a plurality of light source devices connected together, wherein each of the plurality of light source devices comprises: a substrate on which a plurality of solid state light sources are disposed; a heat radiator including a joint surface joined to the substrate, a connecting part connected to any of the other light source devices, and a radiating fin for dissipating heat of the substrate; a housing to accommodate the radiating fin, the housing having, near the radiating fin, a first opening for distributing a gas; and a fan to distribute the gas to the radiating fin, and wherein the first openings of the light source devices different from each other are opposed to each other so that a clearance for distributing the gas is provided therebetween.

17 Claims, 4 Drawing Sheets

(51) Int. Cl.

| | |
|---|---|
| ***B41J 29/377*** | (2006.01) |
| ***F21V 23/00*** | (2015.01) |
| ***F21V 29/67*** | (2015.01) |
| ***F21V 29/71*** | (2015.01) |
| ***F21V 29/76*** | (2015.01) |
| ***F21V 29/83*** | (2015.01) |
| ***F21Y 115/10*** | (2016.01) |

(52) U.S. Cl.
CPC .......... *F21V 29/673* (2015.01); *F21V 29/713* (2015.01); *F21V 29/767* (2015.01); *F21V 29/83* (2015.01); *B41J 11/00214* (2021.01); *B41J 11/00218* (2021.01); *F21V 29/67* (2015.01); *F21Y 2115/10* (2016.08)

(58) Field of Classification Search
CPC ...... F21V 29/677; F21V 29/71; F21V 29/713; F21V 29/767; F21V 29/83
See application file for complete search history.

(56) References Cited

FOREIGN PATENT DOCUMENTS

| | | | | | |
|---|---|---|---|---|---|
| JP | 2017-177088 A | | 10/2017 | |
| KR | 20170113127 A | * | 10/2017 | ............ F21V 29/717 |
| KR | 102016288 B1 | * | 8/2019 | .............. F21V 29/67 |

OTHER PUBLICATIONS

Watanabe Hiroaki, "Heat Radiating Apparatus and Light Illuminating Apparatus With the Same", Oct. 12, 2017, Image document merged English Text, 28 pages then text. (Year: 2017).*
The extended European search report issued by the European Patent Office on Dec. 13, 2023, which corresponds to European Patent Application No. 23183004.3-1201 and is related to U.S. Appl. No. 18/348,031.

* cited by examiner

LIGHT SOURCE UNIT, LIGHT SOURCE DEVICE, AND METHOD FOR FORMING LIGHT SOURCE UNIT

CROSS-REFERENCE TO RELATED APPLICATIONS

This application claims priority of Japan Patent Application No. 2022-110130, which was filed on Jul. 8, 2022, and which is incorporated herein in its entirety by reference.

BACKGROUND OF THE INVENTION

Field of the Invention

The present invention relates to a light source unit, a light source device, and a method for forming a light source unit.

Description of the Related Art

In recent years, light source devices using light sources such as LEDs have been used for curing printing inks or adhesives for bonding display substrates. Printing paper or a display substrate has a wide variety in size and shape. Therefore, a light source unit is known which is formed by connecting a plurality of light source devices so that an irradiation area can flexibly be changed depending on the size and shape of an object to be irradiated, such as printing paper or a display substrate.

PRIOR ART DOCUMENTS

Patent Documents

Patent Document 1: JP-A-2013-171882
Patent Document 2: JP-A-2017-177088

SUMMARY OF THE INVENTION

The market expects an improvement in irradiance uniformity in the irradiation area of a light source unit. An object of the present invention is to provide a light source unit having improved irradiance uniformity, a light source device included in the light source unit, and a method for forming a light source unit.

The present invention is directed to a light source unit including a plurality of light source devices connected together, wherein each of the plurality of light source devices includes:

- a substrate on which a plurality of solid state light sources are disposed;
- a heat radiator including a joint surface joined to the substrate, a connecting part connected to any of the other light source devices, and a radiating fin for dissipating heat of the substrate;
- a housing to accommodate the radiating fin, the housing having, near the radiating fin, a first opening for distributing a gas; and
- a fan to distribute the gas to the radiating fin, and wherein
- the first openings of the light source devices different from each other are opposed to each other so that a clearance for distributing the gas is provided therebetween.

The present inventors have focused on the fact that variation in substrate temperature between light source devices connected together influences the light output of the light source devices connected together, and as a result have developed the light source unit described above. Although the details will be described later, the clearance between the opposed first openings of the light source devices different from each other in the light source unit makes it possible to supply a gas for cooling to each of the light source devices connected together. As a result, heat of the substrate can efficiently be dissipated in each of the light source devices constituting the light source unit so that variation in substrate temperature between the light source devices connected together can be reduced. Therefore, variation in light output between the light source devices is reduced so that irradiance uniformity in the irradiation area of the light source unit improves.

The heat radiator herein refers to a member joined to a substrate, on which a plurality of solid state light sources are disposed, to receive and dissipate heat of the substrate. When a heat-transfer material such as a heat-transfer plate, a heat-transfer sheet, or a heat-transfer grease is present between the substrate and the main body of the heat radiator herein, such a heat-transfer material is regarded as a member constituting the heat radiator.

The present invention is also directed to a light source device including:

- a substrate on which a plurality of solid state light sources are disposed;
- a heat radiator including a joint surface joined to the substrate, a connecting part for connection to another light source device, and a radiating fin for dissipating heat of the substrate;
- a housing to accommodate the heat radiator; and
- a fan to distribute a gas outside the housing to the radiating fin, wherein
- the housing has, in a side surface thereof and near the radiating fin, a first opening for distributing the gas, and the first opening is located on an inner side of the connecting part.

When the light source device located on the inner side of the connecting part is connected to another light source device, the first opening is opposed to the first opening of the another light source device connected. Since the first opening is located on the inner side of the connecting part, a clearance for distributing the gas is formed between the two first openings opposed to each other. This reduces variation in substrate temperature between the light source devices connected together. As a result, variation in light output between the light source devices is reduced so that irradiance uniformity in the irradiation area of the light source unit improves.

The radiating fin may include a plate member, and the plate member may extend in a direction intersecting the side surface having the opening.

The housing has the first opening in at least one side surface thereof. However, the housing may have the first opening in each of two side surfaces thereof opposed to each other and near the radiating fin. Further, the housing may have the first opening in each of four side surfaces thereof.

At least one of the light source devices may further have a power-feeding connector joined to the substrate so as to avoid the heat radiator joined to the substrate. The power-feeding connector of the at least one of the light source devices or of the light source device may include a plurality of power-feeding connectors.

In at least one of the light source devices, the plurality of solid state light sources may be arranged along a first direction and a second direction orthogonal to the first direction so that an arrangement pitch in the first direction is larger than that in the second direction and at least two of the plurality of power-feeding connectors align in the first direction. The arrangement pitch in the first direction may be the same as that in the second direction.

The housing of at least one of the light source devices may have a windshield part to prevent mixing of a gas that will flow into the housing and a gas discharged from the housing.

At least one of the light source devices may have a light-transmitting part on a light-emitting side of the plurality of solid state light sources. The light-transmitting part may be a member disposed across the plurality of light source devices. The light-transmitting part may be a member disposed in each of the light source devices.

At least one of the light source devices may have the light-transmitting part and a supporting part to support the light-transmitting part, and at least part, especially a region where light emitted from the plurality of solid state light sources enters, of the supporting part may have light reflecting function.

The present invention is also directed to a method for forming the light source unit, including:

- preparing a plurality of the light source devices; and
- connecting the plurality of light source devices together using the connecting parts to form a light source unit in which the plurality of light source devices are connected together.

The present invention makes it possible to provide a light source unit formed by connecting light source devices together to have improved irradiance uniformity in its irradiation area, a light source device included in the light source unit, and a method for forming the light source unit.

DETAILED DESCRIPTION OF THE PREFERRED EMBODIMENTS

Embodiments of a light source unit will be described with reference to the drawings. It should be noted that the drawings disclosed herein merely show schematic illustrations. Namely, the dimensional ratios on the drawings do not necessarily reflect the actual dimensional ratios, and the dimensional ratios are not necessarily the same between the drawings.

The drawings will be described with reference to an XYZ coordinate system. When it is necessary to make a distinction between positive or negative to express a direction herein, the direction is described with a positive or negative sign, such as "+X direction" or "−X direction". When it is not necessary to make a distinction between positive or negative to express a direction, the direction is simply described as "X direction". Namely, when the direction is simply described as "X direction" herein, both "+X direction" and "−X direction" are included. The same applies to the Y direction and the Z direction.

First Embodiment

[Overall Structure]

Figure 1:
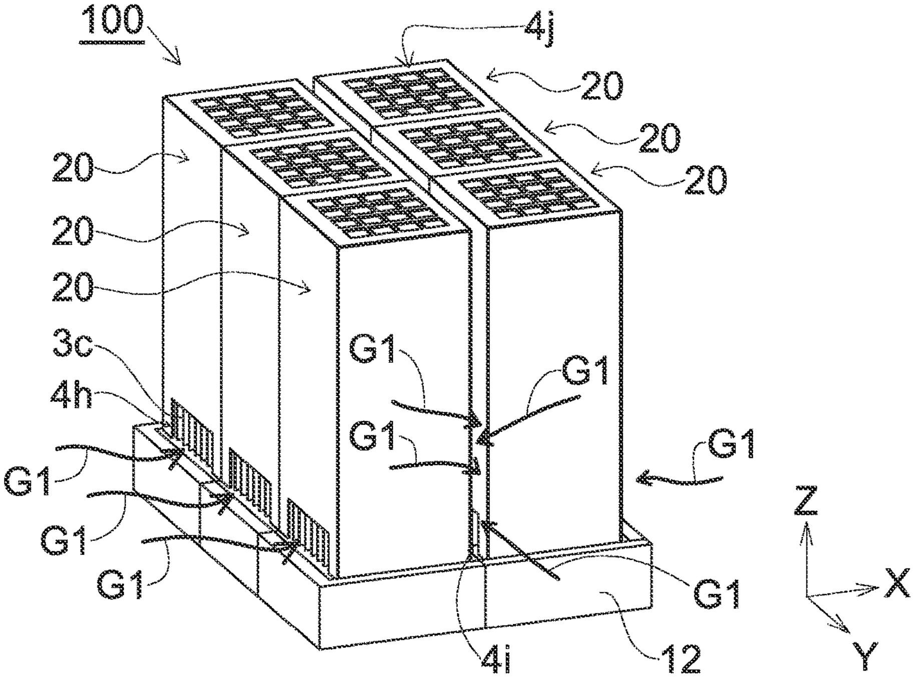
FIG. 1 is a perspective view of a light source unit according to a first embodiment.

A first embodiment of the light source unit will be described with reference to FIG. 1 and FIG. 2. FIG. 1 is a perspective view of a light source unit 100. As shown in FIG. 1, the light source unit 100 has a plurality of light source devices 20, and the plurality of light source devices 20 are arranged in two columns along the X axis and in three rows along the Y axis. The number of the light source devices 20 that the light source unit 100 has is not limited. For example, the light source unit 100 may have 36 light source devices 20 in such a manner that the light source device 20 are arranged in six columns along the X axis and in six rows along the Y axis. The plurality of light source devices 20 are connected together using connecting parts of heat radiators that will be described later. Light of the light source unit 100 is emitted in the −Z direction.

Figure 2:
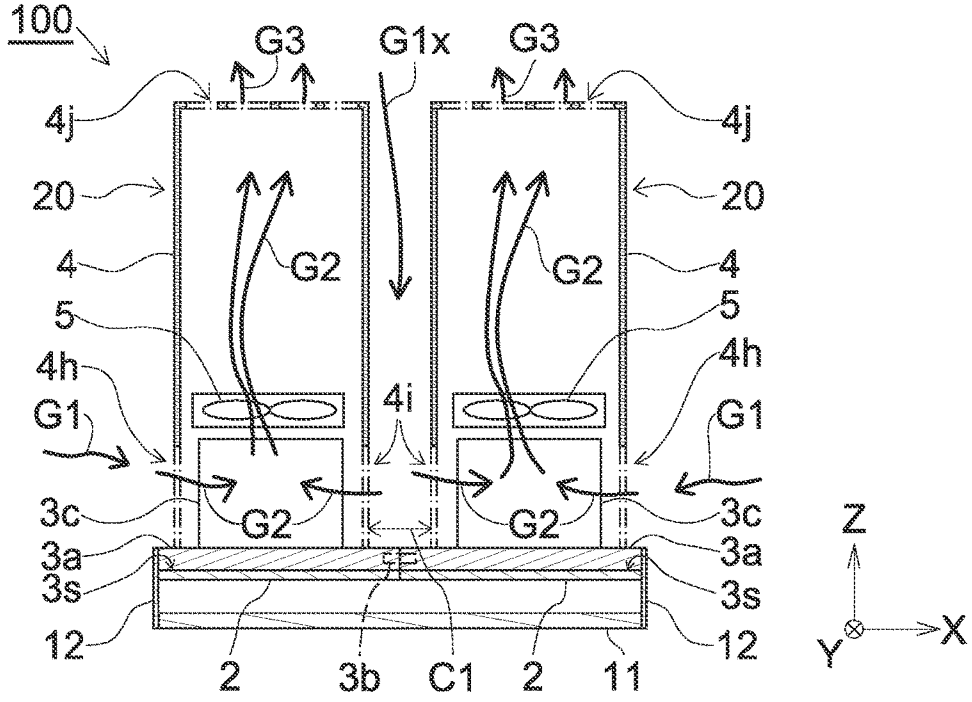
FIG. 2 is a sectional view in an XZ plane of the light source unit shown in FIG. 1.

FIG. 2 is a sectional view in an XZ plane of the light source unit 100 shown in FIG. 1. FIG. 2 shows the section of the two light source devices 20 arranged in the X direction. As shown in FIG. 2, each of the light source devices 20 includes a substrate 2 on which a plurality of solid state light sources 1 (not shown in FIG. 2; see FIG. 3 or FIG. 4) are disposed, a heat radiator 3 joined to the substrate 2, a housing 4 to accommodate the heat radiator 3, and a fan 5 to distribute a gas outside the housing 4 to the heat radiator 3. It should be noted that in FIG. 2, power lines connected to the substrates 2 and the fans 5, a control unit of the light source devices 20, and connectors to electrically connect the inside and outside of the housings 4 are not shown.

The heat radiator 3 includes a main body 3*a* joined to the substrate 2, a connecting part 3*b* for connection to another light source device 20, and a radiating fin 3*c* for dissipating heat of the substrate 2. The main body 3*a* has a joint surface 3*s* joined to the substrate 2. In the present embodiment, the radiating fin 3*c* of each of the light source devices 20 is constituted from a plurality of plate members arranged in the Y direction. Each of the plate members extends along the XZ plane.

The connecting part 3*b* will be described. When a light source device 20 is connected to another light source device 20, the main body 3*a* of the light source device 20 and the main body 3*a* of the another light source device 20 to be connected are connected together using the connecting parts 3*b*. In the present embodiment, the connecting part 3*b* is constituted from a screw hole and a screw. The main body 3*a* of the light source device 20 and the main body 3*a* of the another light source device 20 to be connected each have a screw hole and therefore can be connected by inserting a screw such as a nipple into each of the screw holes. However, the connecting part 3*b* is not limited thereto. For example, the connecting part 3*b* may be one having a concavo-convex structure so that the adjacent main bodies 3*a* are engaged with each other. The connecting part 3*b* may be a fixing frame to tie and tighten a plurality of light source devices 20 together.

The housing 4 has two types of openings to distribute a gas between the inside and outside of the housing 4. One of the openings is a first opening (4*h*, 4*i*) disposed in the side surface of the housing 4. The other is a second opening 4*j* disposed in the top surface (the uppermost surface in the +Z direction) of the housing 4. The gas to be distributed is a gas contained in an environment where the light source unit 100 is placed. The "gas contained in an environment" is usually air. However, there is a case where the light source unit 100 itself is placed in an inert gas atmosphere such as nitrogen gas. In such a case, the "gas contained in an environment" is an inert gas.

The first openings (4*h*, 4*i*) are present near the radiating fin 3*c*. Since the first openings (4*h*, 4*i*) are present near the radiating fin 3*c*, a gas flowing into the housing 4 through the first openings (4*h*, 4*i*) can immediately come into contact with the radiating fin 3*c*. The plate members constituting the radiating fin 3*c* extend in a direction intersecting the side surface of the housing 4 having the first opening (4*h*, 4*i*). In the present embodiment, the plate members constituting the radiating fin 3*c* extend in the X direction, and the side surface having the first opening (4*h*, 4*i*) extends in the YZ plane. Therefore, the radiating fin 3*c* and the first openings (4*h*, 4*i*) intersect at right angle with each other.

In the present embodiment, each of the two side surfaces opposed to each other has the first opening (4*h*, 4*i*). Specifically, one of the two side surfaces opposed to each other with the radiating fin 3*c* being interposed therebetween has the first opening 4*h* and the other side surface has the first opening 4*i*. The first opening 4*h* is in contact with the outer periphery of the light source devices 20 connected together. The first opening 4*i* is located inside the light source devices 20 connected together. The first opening 4*i* of one light source device 20 is opposed to the first opening 4*i* of another light source device 20. The first opening 4*h* and the first opening 4*i* are not different in the structure of the opening itself. Whether the opening of the light source device 20 is the first opening 4*h* in contact with the outer periphery of the light source devices 20 connected together or the first opening 4*i* located inside the light source devices 20 connected together is determined by how the light source device 20 is disposed.

Each of the light source devices 20 has at least one of the first openings (4*h*, 4*i*) and the second opening 4*j* to distribute a gas to the inside thereof. In one light source device 20, each of the two side surfaces thereof opposed to each other may have the first opening (4*h*, 4*i*). This improves the cooling efficiency of the light source device 20 due to an increase in the volume of a gas flowing into the light source device 20.

When three or more light source devices 20 are arranged in one direction, at least one light source device 20 is not located at the end of the light source unit 100 (i.e., at least one light source device 20 is sandwiched between the other light source devices 20). In order to distribute a gas to the inside of the housing 4 of the "light source device 20 not located at the end", it is particularly preferred that each of the two side surfaces opposed to each other of the housing 4 has the first opening (4*h*, 4*i*).

FIG. 1 shows that each of the first openings 4*h* is constituted from a single opening. FIG. 1 shows that each of the second openings 4*j* is constituted from a plurality of small openings formed by dividing a single opening having a large area by a grid. The first opening 4*h* or the second opening 4*j* having such a shape is merely an example. The shape, size, and the number of openings of each of the first opening (4*h*, 4*i*) and the second opening 4*j* are not limited.

As shown in FIG. 2, for explanatory convenience, a gas is expressed as G1, G2, and G3 that are distinguished depending on an area where the gas flows. Needless to say, the gases (G1, G2, G3) represent the same gas. The fan 5 in the present embodiment sucks a gas near the radiating fin 3*c* to create the flow of a gas. The flow of a gas refers to a flow such that a gas G1 outside the housing 4 flows into the housing 4 through the first openings (4*h*, 4*i*) and a gas G2 flowing into the housing 4 is sent in the +Z direction and discharged as a gas G3 to the outside of the housing 4 through the second opening 4*j*. The cool gas G2 outside the housing 4 comes into contact with the radiating fin 3*c* so that the radiating fin 3*c* is cooled.

The first openings (4*h*, 4*i*) and the second opening 4*j* are respectively a gas inlet and a gas outlet for each of the light source devices 20 of the present embodiment. As a modification, the fan 5 may be designed so that the second opening 4*j* functions as a gas inlet and the first openings (4*h*, 4*i*) functions as a gas outlet.

The light source unit 100 has a clearance C1 (see FIG. 2) for distributing a gas between the opposed first openings 4*i* of the light source devices different from each other. The clearance C1 is formed by locating the first opening 4*i* of each of the light source devices 20 on the inner side of the connecting part 3*b*. A gas outside the light source unit 100 flows into the housing 4 through the clearance C1 and then the first openings 4*i*. It should be noted that in the light source unit 100, the first openings 4*h* in contact with the outer periphery of the light source devices 20 connected together allow the gas G1 to flow into the housings 4 without passing through the clearance C1.

The sizes or the like of the clearance C1, the first opening (4*h*, 4*i*), and the second opening 4*j* are parameters related to the conductance of a gas. These parameters and the output of the fan 5 can be designed based on a desired gas intake volume. All the light source devices 20 constituting the light source unit 100 may be the same in the values of the parameters and the output of the fan 5. Alternatively, setting of the parameters and the output of the fan 5 may individually be performed on each of the light source devices 20 based on the irradiance distribution or temperature distribution of the light source devices 20 constituting the light source unit 100.

[Solid State Light Sources and Substrate]

Figure 3:
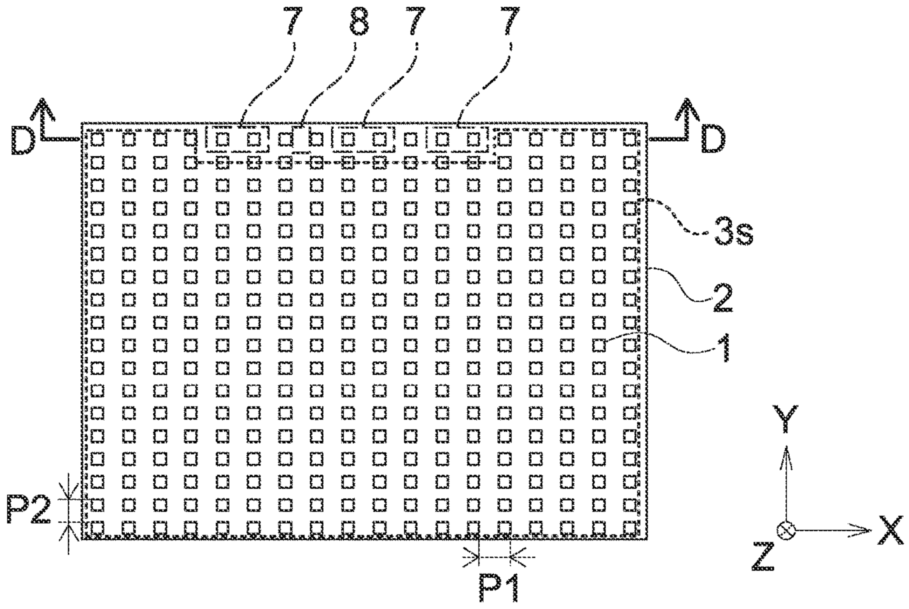
FIG. 3 is a diagram of a substrate of one light source device viewed from a light-emitting side.

FIG. 3 is a diagram of the substrate 2 of any one of the light source devices 20 viewed from the light-emitting side (−Z side). In FIG. 3, a light-transmitting part 11 and a supporting part 12 which will be described later are not shown. On the surface as the −Z-side principal surface of the substrate 2, the plurality of solid state light sources 1 are arranged in the X direction and the Y direction. In the present embodiment, the solid state light sources 1 are LEDs that emit ultraviolet light.

The solid state light sources 1 are not limited to LEDs. The solid state light sources 1 may be, for example, semiconductor laser elements. The emission wavelength of the solid state light sources 1 of the present embodiment is, for example, 250 nm to 450 nm. The emission wavelength of the solid state light sources 1 is not limited to the wavelength in the ultraviolet range.

The number of the solid state light sources 1 per one substrate 2 is not limited, and may be, for example, 100 or more, preferably 200 or more and 800 or less, preferably 500 or less.

The solid state light sources 1 used in the present embodiment are bare chip products (products each produced by disposing an LED element on a substrate without covering with a protective member). The solid state light sources 1 may be packaged products (products each having an LED element covered with a protective member).

The X-direction size and Y-direction size of the substrate 2 may be each 50 mm or more, preferably 80 mm or more.

The X-direction size and Y-direction size of the substrate 2 may be each 150 mm or less, preferably 120 mm or less.

The solid state light sources 1 are arranged at a certain pitch in one direction. As for the solid state light sources 1 of the present embodiment, an X-direction arrangement pitch P1 is larger than a Y-direction arrangement pitch P2. For example, the X-direction arrangement pitch P1 may be 1.1 times or more, preferably 1.3 times or more the Y-direction arrangement pitch P2. The X-direction arrangement pitch P1 may be 2 times or less, preferably 1.7 times or less the Y-direction arrangement pitch P2. The solid state light sources 1 are sparsely arranged in the X direction and are densely arranged in the Y direction. It should be noted that the X-direction arrangement pitch P1 and the Y-direction arrangement pitch P2 may be substantially the same (e.g., the difference between the pitches is 5% or less).

[Heat Radiator]

Figure 4:
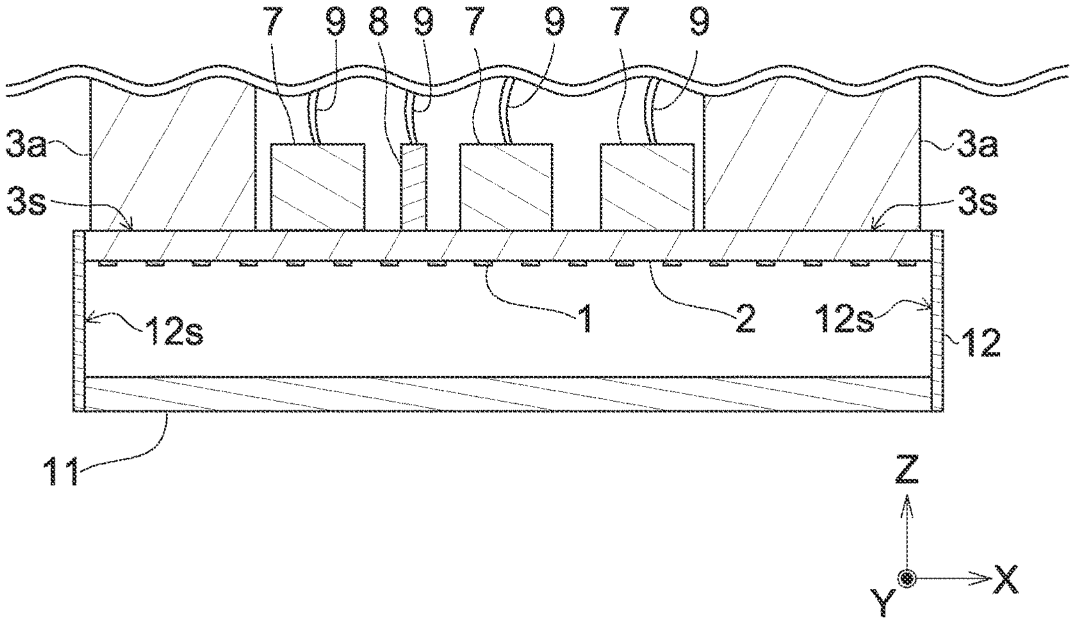
FIG. 4 is a partially enlarged sectional view taken along line D-D in FIG. 3.

FIG. 4 is a partially enlarged sectional view taken along line D-D in FIG. 3. As shown in FIG. 4, on the back surface as the +Z-side principal surface of the substrate 2, the main body 3*a* of the heat radiator 3, power-feeding connectors 7, and a temperature sensor 8 are disposed. Each of the power-feeding connectors 7 and the temperature sensor 8 is connected to a power line 9. The power line 9 transmits electric energy or an electric signal.

In FIG. 3, the joint surface 3*s* of the main body 3*a* of the heat radiator 3, the power-feeding connectors 7, and the temperature sensor 8 are shown by broken lines. The joint surface 3*s* occupies a large part of the area of back surface of the substrate 2 (e.g., 90% or more of the area of back surface of the substrate). This makes it possible to efficiently dissipate heat of the substrate 2. The joint surface 3*s* shown in FIG. 3 is slightly smaller in size than the substrate 2, but the joint surface 3*s* may have the same size as the substrate 2. The joint surface 3*s* may be slightly larger in size than the substrate 2. Each of the power-feeding connectors 7 and the temperature sensor 8 is joined to the back surface of the substrate 2 so as to avoid the joint surface 3*s* of the main body 3*a* of the heat radiator 3.

In the present embodiment, each of the light source devices 20 has a plurality of power-feeding connectors 7 for supplying electric power to each of the solid state light sources 1. When the power-feeding connectors 7 are dispersedly disposed on the substrate 2, the amount of current supplied by one power-feeding connector 7 is reduced so that the amount of heat generation of the substrate 2 near the power-feeding connector 7 can be reduced. As a result, a reduction in the irradiance of the solid state light sources 1 due to temperature rise can be prevented so that irradiance uniformity improves. However, it is not always necessary to dispersedly dispose the power-feeding connectors 7, and one power-feeding connector 7 may be disposed.

Each of the plurality of power-feeding connectors 7 is joined to the back surface of the substrate 2 so as to avoid the main body 3*a* of the heat radiator 3 joined to the back surface of the substrate 2. In the present embodiment, three power-feeding connectors 7 are connected to the back surface of the substrate 2. The number of the solid state light sources 1 that align each of the power-feeding connectors 7 in the X direction is preferably larger than the number of the solid state light sources 1 that align each of the power-feeding connectors 7 in the Y direction. In the present embodiment, each of the power-feeding connectors 7 is disposed so that the longitudinal direction of the power-feeding connector 7 is parallel to the X direction. As a result, each of the power-feeding connector 7 aligns the plurality of solid state light sources 1 in the X direction and aligns one solid state light source 1 in the Y direction.

The Y direction is a direction in which the solid state light sources 1 are more densely disposed than in the X direction (hereinafter the "Y direction" is sometimes referred to as "dense direction"). The X direction is a direction in which the solid state light sources 1 are more sparsely disposed than in the Y direction (hereinafter the "X direction" is sometimes referred to as "sparse direction"). The area where the power-feeding connector 7 is disposed easily increases in temperature because the main body 3*a* of the heat radiator 3 cannot be disposed. Therefore, the region of the substrate 2 not in contact with the main body 3*a* of the heat radiator 3 is elongated in the sparse direction and is shortened in the dense direction, which makes it possible to prevent an increase in the temperature of the substrate 2 caused by the solid state light sources 1.

As shown in FIG. 3, the power-feeding connectors 7 should be disposed so that they do not align with each other in the dense direction. In the dense direction, the region where the main body 3*a* of the heat radiator 3 cannot be disposed is shortened. This makes it possible to prevent an increase in the temperature of the solid state light sources 1. In FIG. 3, the power-feeding connectors 7 align with each other in the sparse direction. However, the power-feeding connectors 7 may be disposed so that they do not align with each other in the sparse direction, either.

As described above, in the present embodiment, the solid state light sources 1 are arranged at a certain pitch in one direction. However, it is not always necessary to arrange the solid state light sources 1 at a certain pitch in one direction. In the region of the substrate 2 not in contact with the main body 3*a* of the heat radiator 3, the solid state light sources 1 may be arranged at a larger pitch (may sparsely be disposed). Alternatively, the X-direction arrangement pitch and the Y-direction arrangement pitch of the solid state light sources 1 may be the same.

[Fan]

The fan 5 may be any of various types of fans. For example, the fan 5 may be a propeller fan, a sirocco fan, a turbo fan, or a fan other than these. In the present embodiment, an axial-flow cooling fan is used. In the present embodiment, the fan 5 is disposed in the housing 4. However, a fan disposed outside the housing 4 may be used. The rotation speed of the fan 5 may be, for example, 5,000 rpm or more, preferably 10,000 rpm or more. The rotation speed of the fan 5 may be, for example, 30,000 rpm or less, preferably 20,000 rpm or less.

The light source devices 20 may be the same or may be made purposely different in the rotation speed of the fan 5. The rotation speed of the fan 5 of the light source device 20 whose gas conductance is relatively low may be made higher than the rotation speed of the fan 5 of the light source device 20 whose gas conductance is relatively high. The rotation speed of the fan 5 may be controlled according to the temperature detected by the temperature sensor 8.

[Temperature Sensor]

The temperature sensor 8 shown in FIG. 4 is a sensor to measure the temperature of the substrate 2. The temperature sensor 8 may be a thermocouple or a resistance temperature detector.

[Supporting Part and Light-Transmitting Part]

As shown in FIG. 2 and FIG. 4, the light source unit 100 has a light-transmitting part 11 on the light-emitting side (−Z side) of the substrate 2. The light-transmitting part 11 is a cover to protect the solid state light sources 1 and the substrate 2. The light-transmitting part 11 is transparent to light emitted from the solid state light sources 1. The light-transmitting part 11 is supported by a supporting part 12. In the case of the present embodiment, the light-transmitting part 11 is a shared member disposed across the plurality of light source devices 20.

In the present embodiment, an inner side surface 12*s* (see FIG. 4) of the supporting part 12 has the function of reflecting light emitted from the solid state light sources 1. The regular reflectance of the inner side surface 12*s* may be 50% or more, preferably 60% or more, more preferably 70% or more. The supporting part 12 may be made of an aluminum-based material, but the material of the supporting part 12 is not limited. The light reflecting function may be achieved by, for example, mirror polishing of the inner side surface 12*s* or forming a reflective coating layer on the inner side surface 12*s*.

Second Embodiment

A light source unit according to a second embodiment will be described. The description will be made by focusing on differences from the light source unit according to the first embodiment. The matters that will not be described below are the same as those described above with reference to the light source unit according to the first embodiment. Also in the case of a third embodiment and a fourth embodiment, the matters that are the same as those of the light source unit described above will not repeatedly be described.

Figure 5:
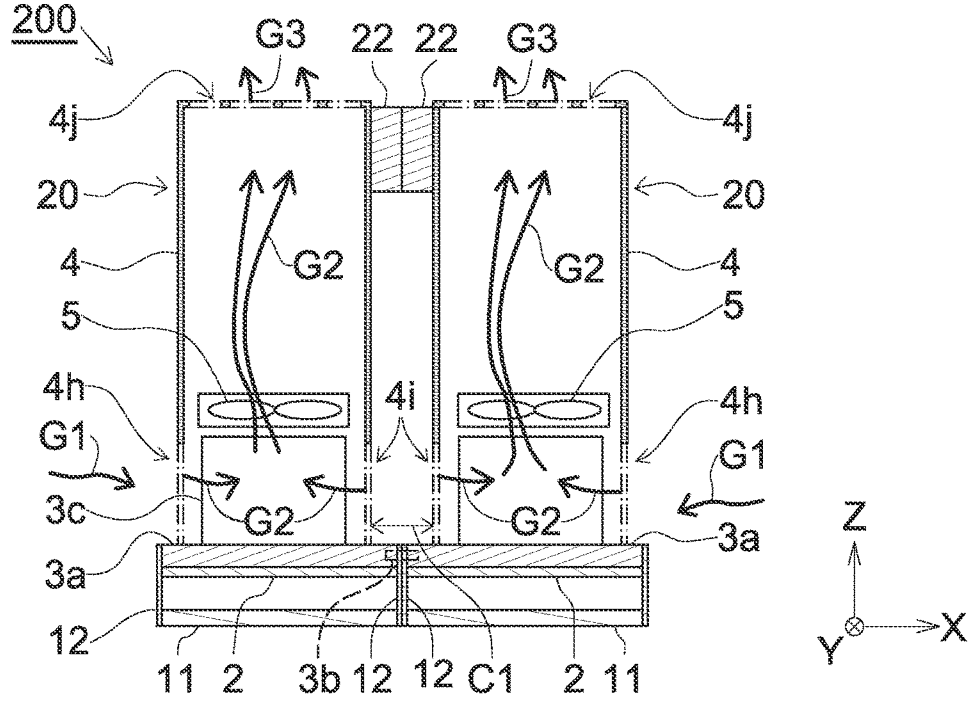
FIG. 5 is a sectional view of a light source unit according to a second embodiment.

FIG. 5 is a sectional view of a light source unit 200 according to the second embodiment. The light source unit 200 has the plurality of light source devices 20. Each of the light source devices 20 has a windshield part 22. The windshield part 22 is disposed between the housing 4 and the housing 4 of the adjacent light source device 20. The function of the windshield part 22 will be described by comparison between FIG. 2 and FIG. 5. As shown in FIG. 2, a gas flowing into the clearance C1 includes not only a gas G1 flowing into the clearance C1 from relatively the same height but also a gas G1*x* flowing into the clearance C1 from the vicinity of the second opening 4*j*. The gas G1*x* may include a gas G3 having a relatively high temperature due to passage through the inside of the light source device 20.

Therefore, as shown in FIG. 5, the windshield part 22 to block the flow path of the gas G1*x* is disposed in the flow path of the gas G1*x* to prevent a gas near the second opening 4*j* from flowing into the clearance C1 between the first openings 4*i*. This makes it possible to prevent the gas G3 having a relatively high temperature due to passage through the inside of the light source device 20 from being again mixed into the gas G1 that will flow into the light source device 20. Therefore, the temperature of the gas G1 flowing into the housing 4 can be reduced so that cooling efficiency improves.

The windshield part 22 is preferably one that blocks the flow of a gas in the Z direction but does not block the flow of a gas in the Y direction. This makes it possible, even when the windshield part 22 is provided, to allow the gas G1 flowing in the Y direction in the clearance C1 between the first openings 4*i* to flow into the housing 4 through the first opening 4*i*.

In the second embodiment, each of the light source devices 20 individually has a light-transmitting part 11. Each of the light-transmitting parts 11 is supported by an individual supporting part 12. As just described, it is not always necessary for the light source devices 20 to have a shared light-transmitting part 11.

Third Embodiment

Figure 6:
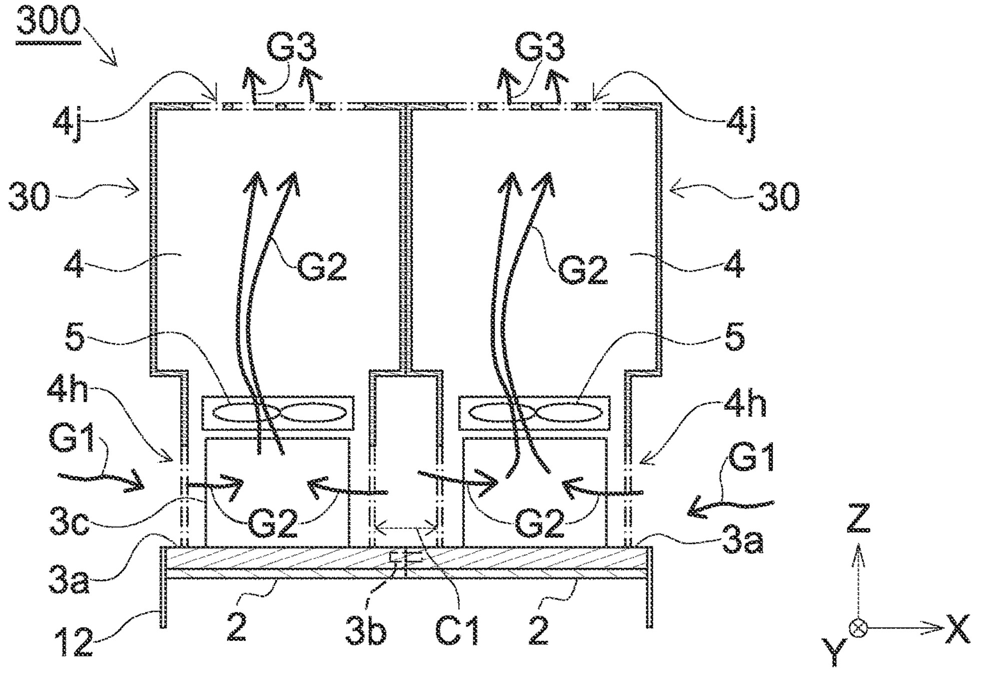
FIG. 6 is a sectional view of a light source unit according to a third embodiment.

FIG. 6 is a sectional view of a light source unit 300 according to a third embodiment. The light source unit 300 has a plurality of light source devices 30. The housing 4 of each of the light source devices 30 has a structure such that a portion near the second opening 4*j* protrudes to come into contact with the housing 4 of the adjacent light source device 30. This makes it possible for the housing 4 to block the flow path of the gas G1*x* (see FIG. 2) flowing into the clearance C1 from the vicinity of the second opening 4*j* without disposing the windshield part 22 along the outer periphery of the housing 4.

Fourth Embodiment

Figure 7:
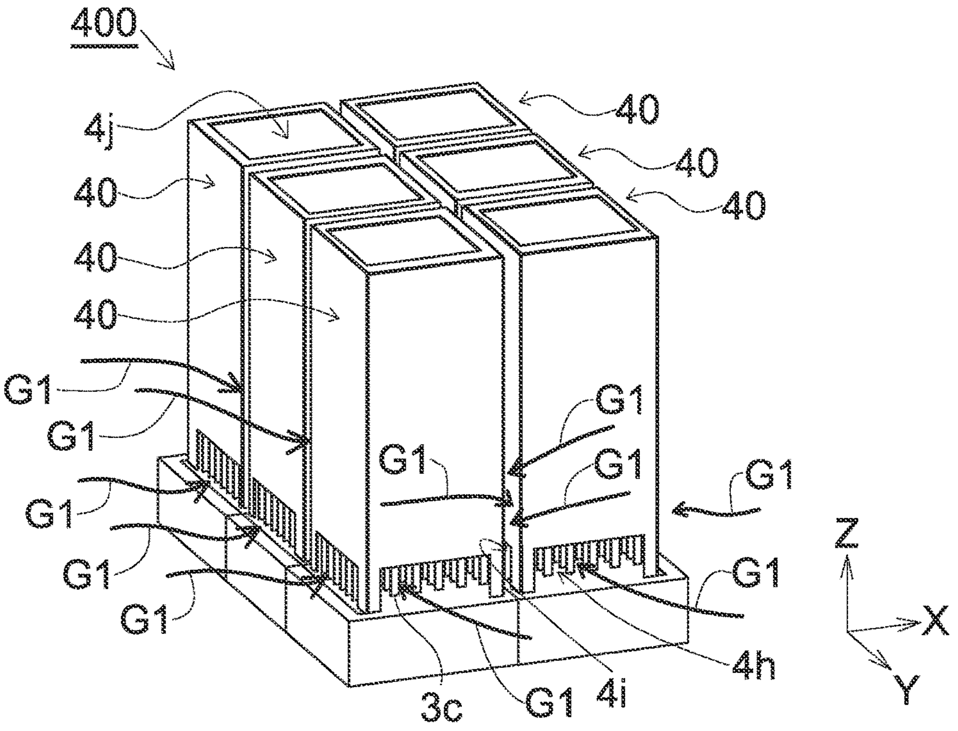
FIG. 7 is a perspective view of a light source unit according to a fourth embodiment.
Figure 8:
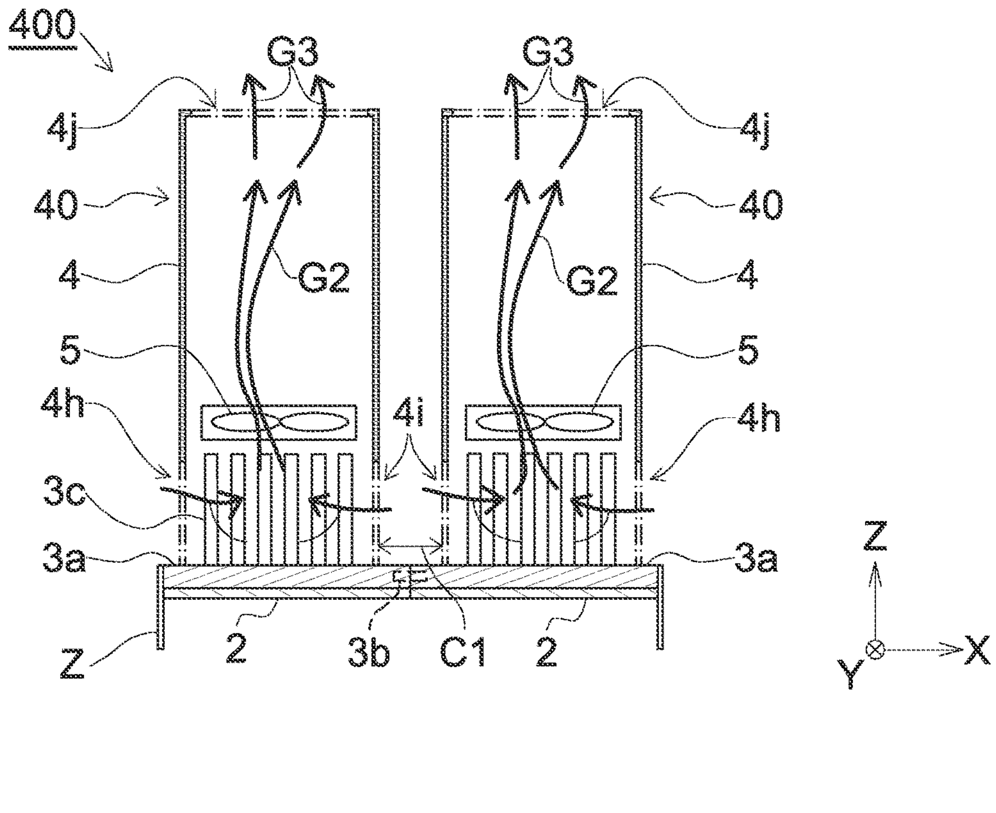
FIG. 8 is a sectional view of the light source unit according to the fourth embodiment.

FIG. 7 is a perspective view of a light source unit 400 according to a fourth embodiment. FIG. 8 is a sectional view of the light source unit 400. The light source unit 400 has a plurality of light source devices 40. Each of the light source devices 40 has the first opening (4*h*, 4*i*) in each of the four side surfaces of the housing 4. Further, each of the light source devices 40 has a strip-type radiating fin 3*c*. The strip-type radiating fin 3*c* can come into contact with a gas flowing into the housing 4 from the X direction and the Y direction. The strips of the radiating fin 3*c* may have a column shape or a needle shape.

The first opening 4*i* is present not only between the housings 4 opposed to each other in the X direction but also between the housings 4 opposed to each other in the Y direction. Therefore, the gas G1 can flow into the light source device 40 not only from a clearance between the light source devices 40 adjacent to each other in the X direction but also from a clearance between the light source devices 40 adjacent to each other in the Y direction. This makes it possible to increase the amount of the gas G1 that can flow into the light source devices 40.

In the fourth embodiment, the second opening 4*j* of each of the light source devices 40 is constituted from not multiple openings formed by a grid but a single opening. Therefore, the conductance of a gas is improved by the lack of the grid.

The first embodiment to the fourth embodiment and the modification have been described above. However, the present invention is not limited to the above embodiments and modification, and any two or more of the above embodiments and modification may be combined without departing from the spirit of the present invention. Further, various changes or improvements may be made to the embodiments and the modification without departing from the spirit of the present invention.

What is claimed is:

1. A light source unit comprising a plurality of light source devices connected together, wherein each of the plurality of light source devices comprises:

a substrate on which a plurality of solid state light sources are disposed;

a heat radiator including a joint surface joined to the substrate, a connecting part connected to any of the other light source devices, and a radiating fin for dissipating heat of the substrate;

a housing to accommodate the radiating fin, the housing having, near the radiating fin, a first opening for distributing a gas; and a fan to distribute the gas to the radiating fin, and wherein the first openings of the light source devices different from each other are opposed to each other, the first openings are located on inner sides of the connecting part and are arranged on each of two side surfaces of the housings of the light source devices different from each other, so that a clearance for distributing the gas is provided therebetween.

2. The light source unit according to claim 1, wherein the radiating fin includes a plate member, and the plate member extends in a direction intersecting a side surface of the housing having the first opening.

3. The light source unit according to claim 2, wherein at least one of the plurality of light source devices further comprises a power-feeding connector joined to the substrate so as to avoid the heat radiator joined to the substrate.

4. The light source unit according to claim 1, wherein at least one of the plurality of light source devices further comprises a power-feeding connector joined to the substrate so as to avoid the heat radiator joined to the substrate.

5. The light source unit according to claim 4, wherein the power-feeding connector of the at least one of the plurality of light source devices comprises a plurality of power-feeding connectors.

6. The light source unit according to claim 5, wherein in the at least one of the plurality of light source devices, the plurality of solid state light sources are arranged along a first direction and a second direction orthogonal to the first direction, an arrangement pitch in the first direction is larger than that in the second direction, and at least two of the plurality of power-feeding connectors align in the first direction.

7. The light source unit according to claim 1, wherein the housing of the at least one of the plurality of light source devices has a windshield part to prevent mixing of a gas that will flow into the housing and a gas discharged from the housing.

8. The light source unit according to claim 1, comprising a light-transmitting part disposed on a light-emitting side of the substrate.

9. The light source unit according to claim 8, comprising a supporting part to support the light-transmitting part, wherein at least part of the supporting part has function of reflecting light emitted from the solid state light sources.

10. The light source unit according to claim 8, wherein the light-transmitting part is a member disposed across the plurality of light source devices.

11. A light source device comprising:

a substrate on which a plurality of solid state light sources are disposed;

a heat radiator including a joint surface joined to the substrate, a connecting part for connection to another light source device, and a radiating fin for dissipating heat of the substrate;

a housing to accommodate the heat radiator; and a fan to distribute a gas outside the housing to the heat radiator, wherein the housing has, in a side surface thereof and near the radiating fin, a first opening for distributing the gas, the first opening is located on an inner side of the connecting part, and the connecting part is configured to connect to the another light source device such that another first opening in another housing of the another light source device is located on another inner side of the connecting part.

12. The light source device according to claim 11, comprising a power-feeding connector joined to the substrate so as to avoid the heat radiator joined to the substrate.

13. The light source device according to claim 12, wherein the power-feeding connector comprises a plurality of power-feeding connectors.

14. The light source device according to claim 13, wherein the plurality of solid state light sources are arranged along a first direction and a second direction orthogonal to the first direction, an arrangement pitch in the first direction is larger than that in the second direction, and at least two of the plurality of power-feeding connectors align in the first direction.

15. A method for forming a light source unit, comprising:

preparing a plurality of the light source devices according to claim 13; and connecting the plurality of light source devices together using the connecting parts to form a light source unit in which the plurality of light source devices are connected together.

16. A method for forming a light source unit, comprising:

preparing a plurality of the light source devices according to claim 11; and connecting the plurality of light source devices together using the connecting parts to form a light source unit in which the plurality of light source devices are connected together.

17. A method for forming a light source unit, comprising:

preparing a plurality of the light source devices according to claim 12; and connecting the plurality of light source devices together using the connecting parts to form a light source unit in which the plurality of light source devices are connected together.

* * * * *